US012512085B2

(12) United States Patent
Ichikawa et al.

(10) Patent No.: US 12,512,085 B2

(45) Date of Patent: Dec. 30, 2025

(54) KEYBOARD INSTRUMENT

(71) Applicant: CASIO COMPUTER CO., LTD., Tokyo (JP)

(72) Inventors: Kenzo Ichikawa, Tokyo (JP); Takahiro Mizushina, Tokyo (JP); Wataru Nimura, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 254 days.

(21) Appl. No.: 18/499,656

(22) Filed: Nov. 1, 2023

(65) Prior Publication Data

US 2024/0153477 A1 May 9, 2024

(30) Foreign Application Priority Data

Nov. 4, 2022 (JP) ................................ 2022-177124

(51) Int. Cl.
*G10H 1/34* (2006.01)
*G10C 3/18* (2006.01)

(52) U.S. Cl.
CPC ............... *G10H 1/346* (2013.01); *G10C 3/18* (2013.01)

(58) Field of Classification Search
CPC . G10H 1/346; G10C 3/18; G10C 3/12; G10D 3/00
See application file for complete search history.

(56) References Cited

U.S. PATENT DOCUMENTS

2023/0197045 A1* 6/2023 Shiraishi ................ G10H 1/344 84/423 R

FOREIGN PATENT DOCUMENTS

| | | | |
|---|---|---|---|
| JP | 2002149160 | A | 5/2002 |
| JP | 2003186475 | A | 7/2003 |
| JP | 2008241885 | A | 10/2008 |
| JP | 2013145275 | A | 7/2013 |
| JP | 2018163191 | A | 10/2018 |
| JP | 2020052391 | A | 4/2020 |
| JP | 2020064183 | A | 4/2020 |
| WO | 2018016324 | A1 | 1/2018 |

* cited by examiner

*Primary Examiner* — Kimberly R Lockett

(74) *Attorney, Agent, or Firm* — Scully, Scott, Murphy & Presser, P.C.

(57) ABSTRACT

A keyboard instrument having a key and a link mechanism provided on a lower side of the key, and the link mechanism has a first member having a first fixing fulcrum, a first link pivotally supported on the first fixing fulcrum on one end side, a second member having a second fixing fulcrum provided further forwards and further downwards than the first fixing fulcrum, a second link pivotally supported on the second fixing fulcrum on one end side and a coupling link configured such that a distance between the other end side of the first link rotating about the first fixing fulcrum in response to a key operation and the other end side of the second link rotating about the second fixing fulcrum in response to the key operation is fixed and remains unchanged, and the second link has a counterweight provided further forwards than the second fixing fulcrum.

10 Claims, 10 Drawing Sheets

KEYBOARD INSTRUMENT

CROSS-REFERENCE TO RELATED APPLICATION

This application is based upon and claims the benefit of priority under 35 USC 119 of Japanese Patent Application No. 2022-177124 filed on Nov. 4, 2022, the entire disclosure of which, including the specification, claims, drawings and abstract, is incorporated herein by reference in its entirety.

BACKGROUND

Technical Field

The present disclosure relates to a keyboard instrument.

Description of the Related Art

There have conventionally been disclosed keyboard instruments, and for example, Japanese Unexamined Patent Application Publication No. 2002-149160 discloses a keyboard instrument including a sub-hammer which is connected with a main hammer which is rotatably supported and is provided above a weight of the main hammer.

SUMMARY

According to an aspect of the present disclosure, there is provided a keyboard instrument having a key, and a link mechanism provided on a lower side of the key, wherein the link mechanism has a first member having a first fixing fulcrum, a first link pivotally supported on the first fixing fulcrum on one end side thereof, a second member having a second fixing fulcrum provided further forwards and further downwards than the first fixing fulcrum, a second link pivotally supported on the second fixing fulcrum on one end side thereof and a coupling link configured such that a distance between an other end side of the first link which rotates about the first fixing fulcrum in response to a key operation and an other end side of the second link which rotates about the second fixing fulcrum in response to a key operation is fixed and remains unchanged, and wherein the second link comprises a counterweight provided further forwards than the second fixing fulcrum.

DESCRIPTION OF THE EMBODIMENT

Figure 1:
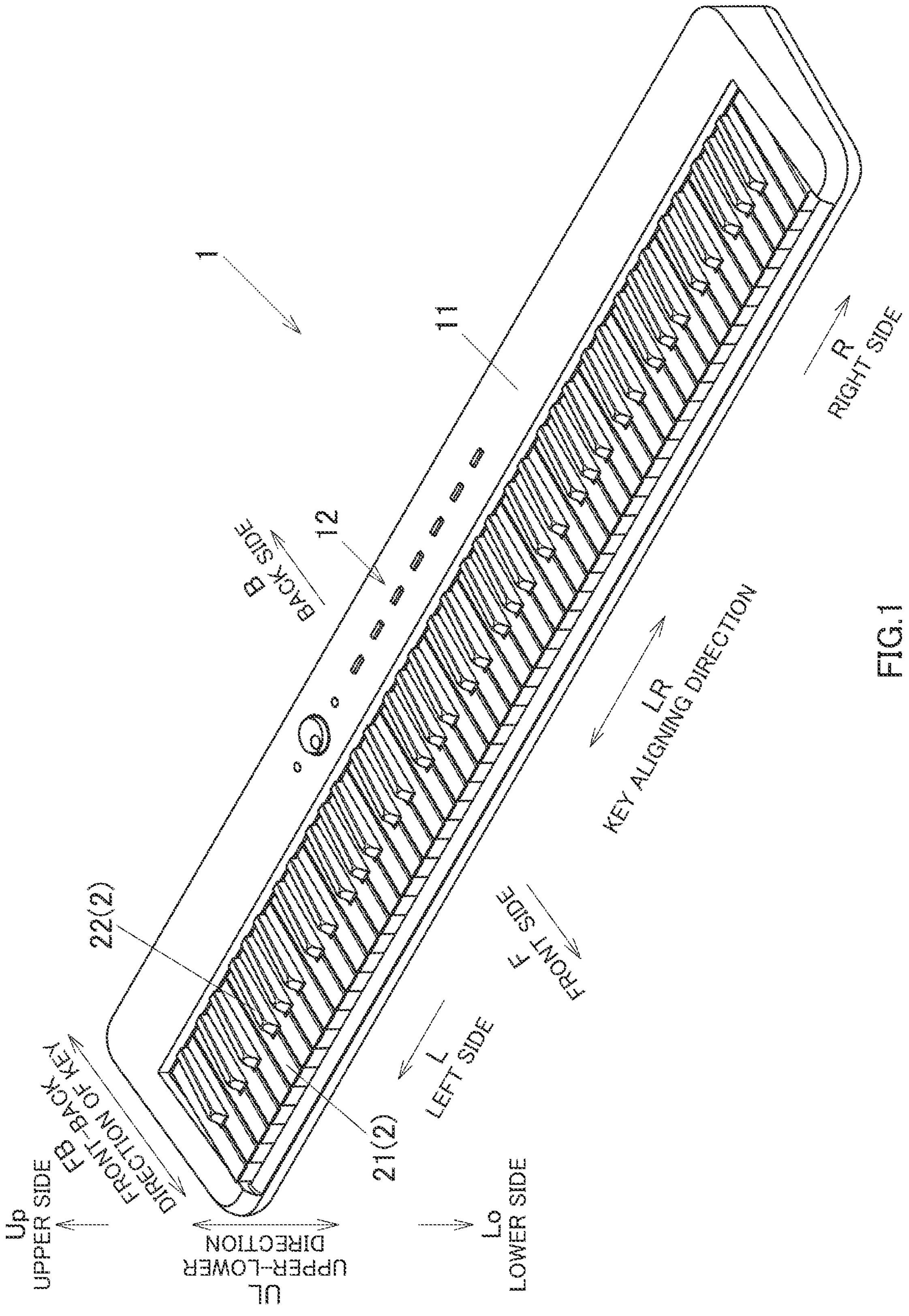
FIG. 1 is an overall perspective view of a keyboard instrument which includes a keyboard device according to an embodiment of the present disclosure.

Hereinafter, referring to drawings, an embodiment of the present disclosure will be described. A keyboard instrument 1 shown in FIG. 1 includes a keyboard device 10 (refer to FIG. 2) including a key 2, and a case 11. In the following description, a front of the key 2 in a front-back direction FB of the key is referred to as a front side F, and a back of the key 2 in the front-back direction FB of the key is referred to as a back side B. A left of the key 2 when the key 2 is seen from the front side F thereof is referred to as a left side L, and a right of the key 2 when the key 2 is seen from the front side F thereof is referred to as a right side R. A key aligning direction LR of the key 2 is referred to as a left-right direction. In addition, in an upper-lower direction UL of the keyboard instrument 1, a side in an upper direction is referred to as an upper side Up, and a side in a lower direction is referred to as a lower side Lo. In the present embodiment, although the keyboard instrument 1 is described as an electronic piano, the keyboard instrument 1 may be of any other type of keyboard instrument as long as it produces sound in response to a key press operation by a player (a user).

The keyboard instrument 1 has multiple keys 2 each functioning as a playing operation element configured to designate the pitch of a note and is formed into a flat plate-like shape which is elongated in the aligning direction LR (the left-right direction) of the keys 2. The keyboard instrument 1 includes a control panel 12, and this control panel 12 includes control buttons and a dial which are operated to select or decide on various types of settings and is disposed at the back of the keys 2. The keys 2 include white keys 21 and black keys 22. The white keys 21 and the black keys 22 are arranged regularly in the left-right direction of the keyboard instrument 1 in a predetermined order.

Figure 2:
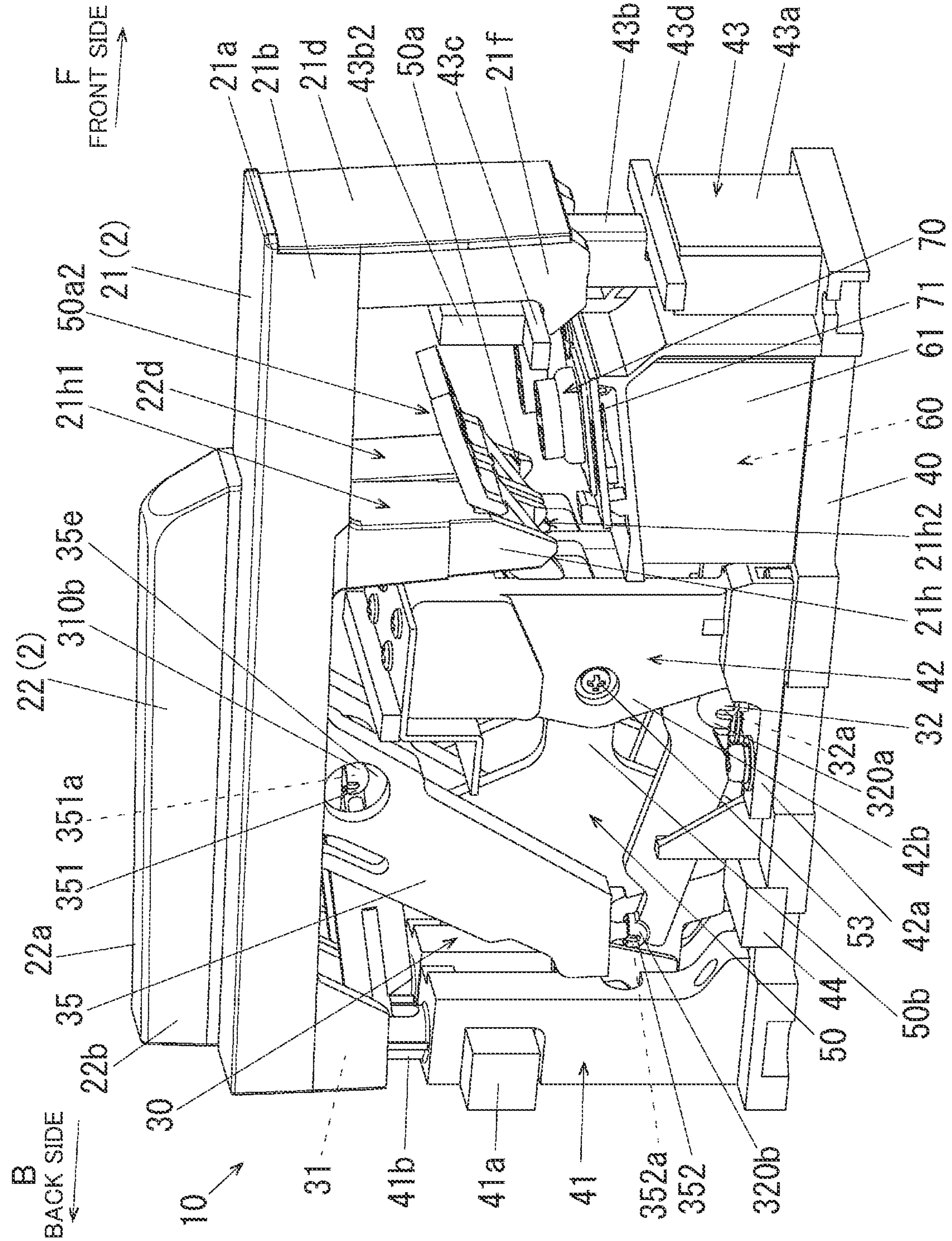
FIG. 2 is a perspective view of the keyboard device according to the embodiment of the present disclosure as viewed from a left front side, showing schematically structures of a white key, a black key, link mechanisms, and the like of the keyboard device in a steady state.
Figure 3:
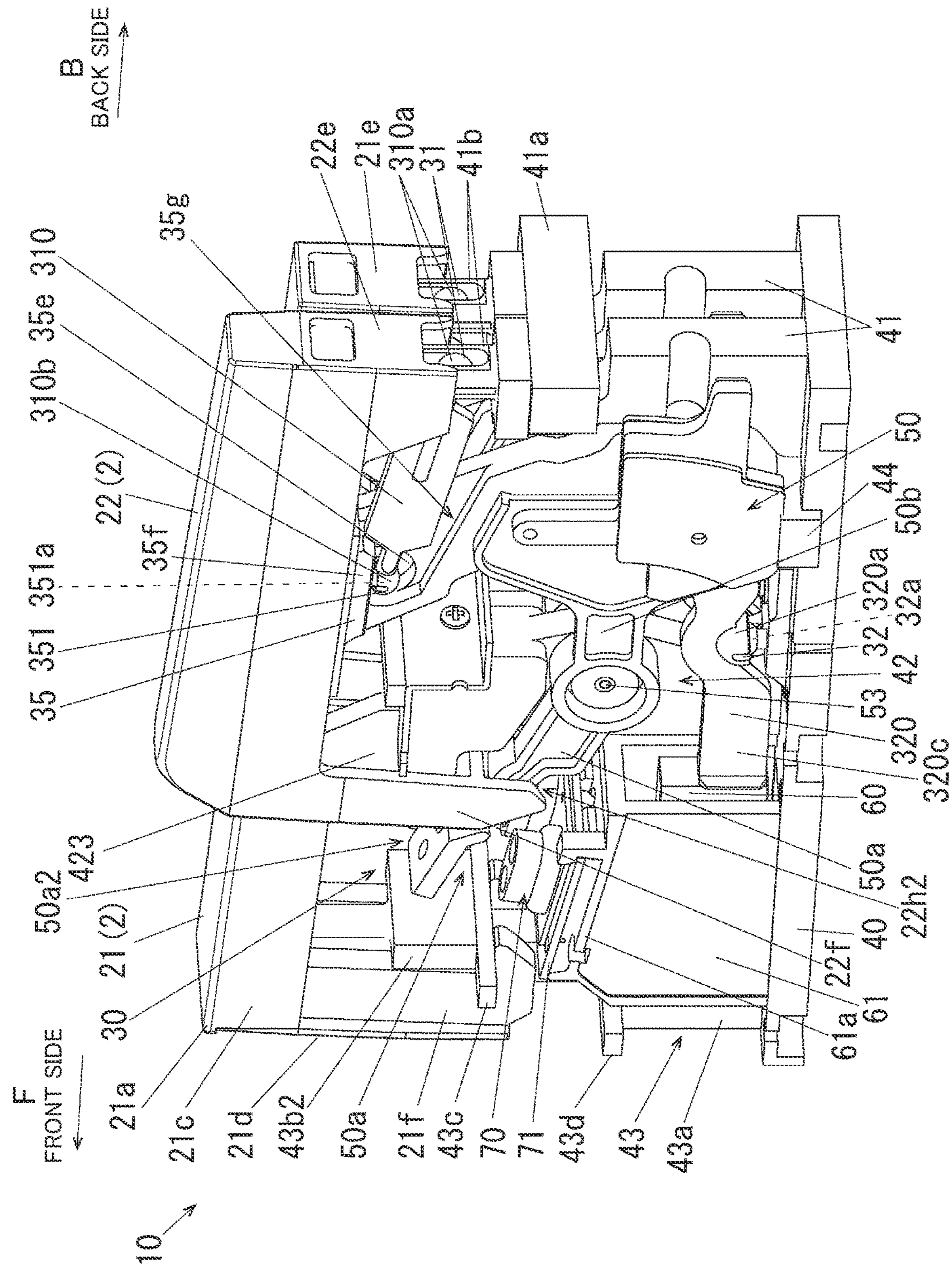
FIG. 3 is a perspective view of the keyboard device according to the embodiment of the present disclosure as viewed from a right back side, showing schematically the structures of the white key, the black key, the link mechanisms, and the like of the keyboard device in the steady state.

FIGS. 2 and 3 are structure drawings illustrating a structure of a keyboard device 10 which includes a white key 21 and a black key 2 which make up the multiple keys 2. Structures of a link mechanism 30 disposed on a lower side of the white key 21, a base 40 having substantially a flat plate shape, and the like are accommodated in an interior of the case 11 of the keyboard instrument 1. Although details will be described later, the link mechanism 30 is connected individually to the white key 21 and the black key 22. The link mechanism 30 includes a counterweight 60. In addition, a hammer 50 includes a press-down area 50*a*2 configured to press down a sound generating switch 70. The key 2 can obtain a dynamic property close to a dynamic property of keys of a grand piano by being connected to the link mechanism 30. The link mechanism 30, the hammer 50, the counterweight 60, and the switch 70 are provided for each of the white key 21 and the black key 22 similarly, and the link mechanisms 30, the hammers 50, the counterweights 60, and the switches 70 of the white key 21 and the black key 22 have substantially the same configuration. Thus, to describe the configurations of these constituent elements of the white key 21 and the black key 22, the configurations of the constituent elements of the white key 21 will be described mainly by reference to FIGS. 2, 3, and 4 to 6.

The link mechanism 30 includes a first member 41 having a first fixing fulcrum 31, a long first link 310, a coupling link 35 (a first coupling point 351, a second coupling point 352), a long second link 320, and a second member 42 having a second fixing fulcrum 32. Here, in the present embodiment, the first link 310, the second link 320, and the coupling link 35 of the link mechanism 30, a coupling ball bearer 41*b*, which will be described later, provided on the first member 41, and a coupling ball 32*a*, which will be described later, provided on the second member 42 are formed from a resin material.

The white key 21 has an upper surface plate 21*a* which includes a surface where the white key 21 is pressed. In the white key 21, a left side plate 21*b* on the left side L, a right side plate 21*c* on the right side R, a front plate 21*d* on the front side F, and a back plate 21*e* on the back side B are provided on a lower side of the upper surface plate 21*a*. Thus, the white key 21 has substantially a shell shape. The white key 21 shown in FIGS. 1 to 6 is disposed for "C" or "F" in the keyboard instrument 1. As a result, the upper surface plate 21*a* and the right side plate 21*c* are provided substantially into a hook shape in a plan view so that the black key 22 can be disposed.

The front plate 21*d* and portions of the left side plate 21*b* and the right side plate 21*c* on the front side F extend towards the lower side Lo, whereby front legs 21*f* are provided on the white key 21. These front legs 21*f* have substantially a hook shape as a result of distal end portions of the portions of the left side plate 21*b* and the right side plate 21*c* being caused to extend towards the back side B. In addition, portions of the left side plate 21*b* and the right side plate 21*c* on the back side B bulges out towards the lower side Lo together with the back plate 21*e*.

Figure 4:
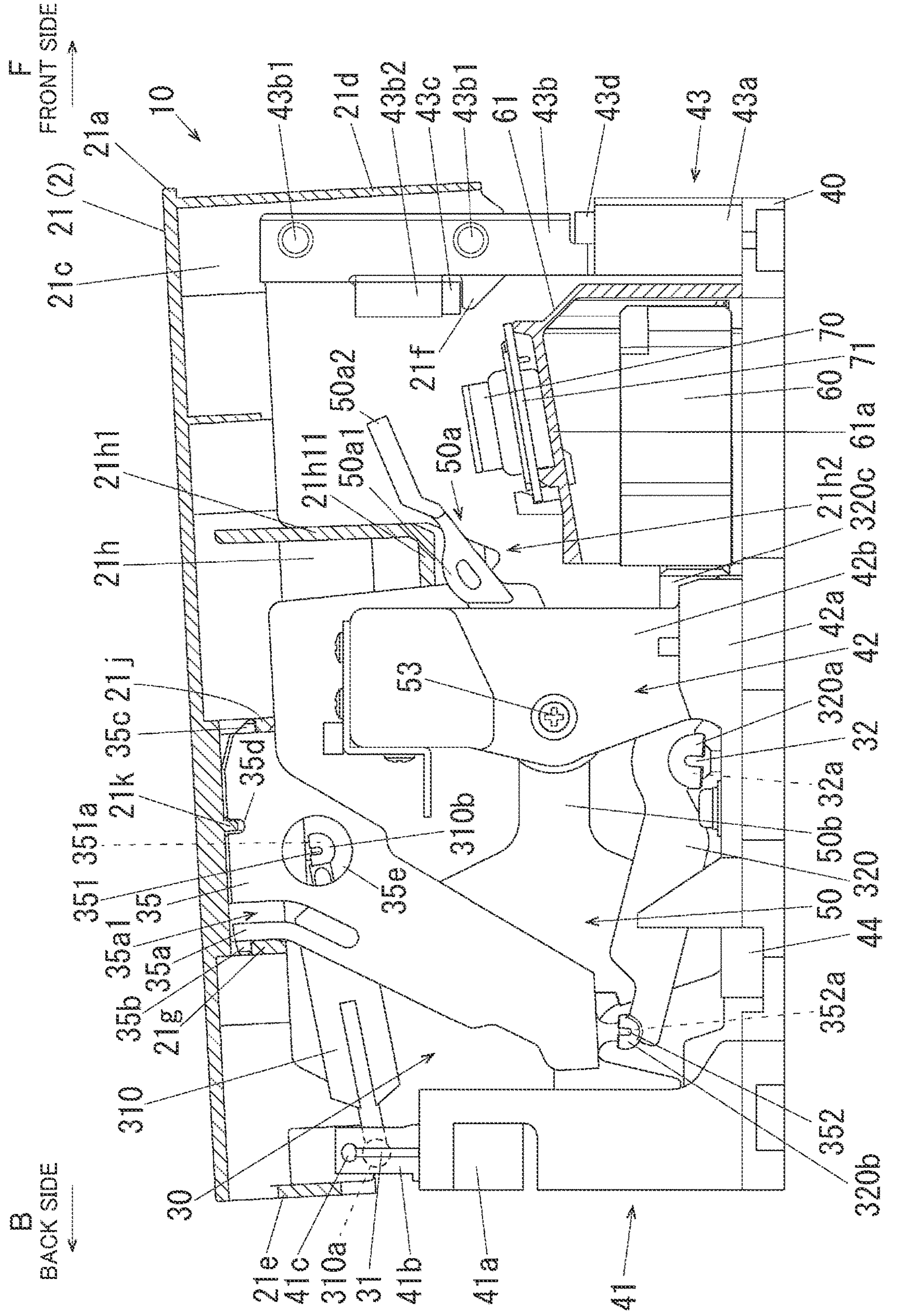
FIG. 4 is a left side view of the keyboard device according to the embodiment of the present disclosure showing schematically the white key and a link mechanism for the white key in the steady state, with the white key and a counterweight case shown in section.
Figure 5:
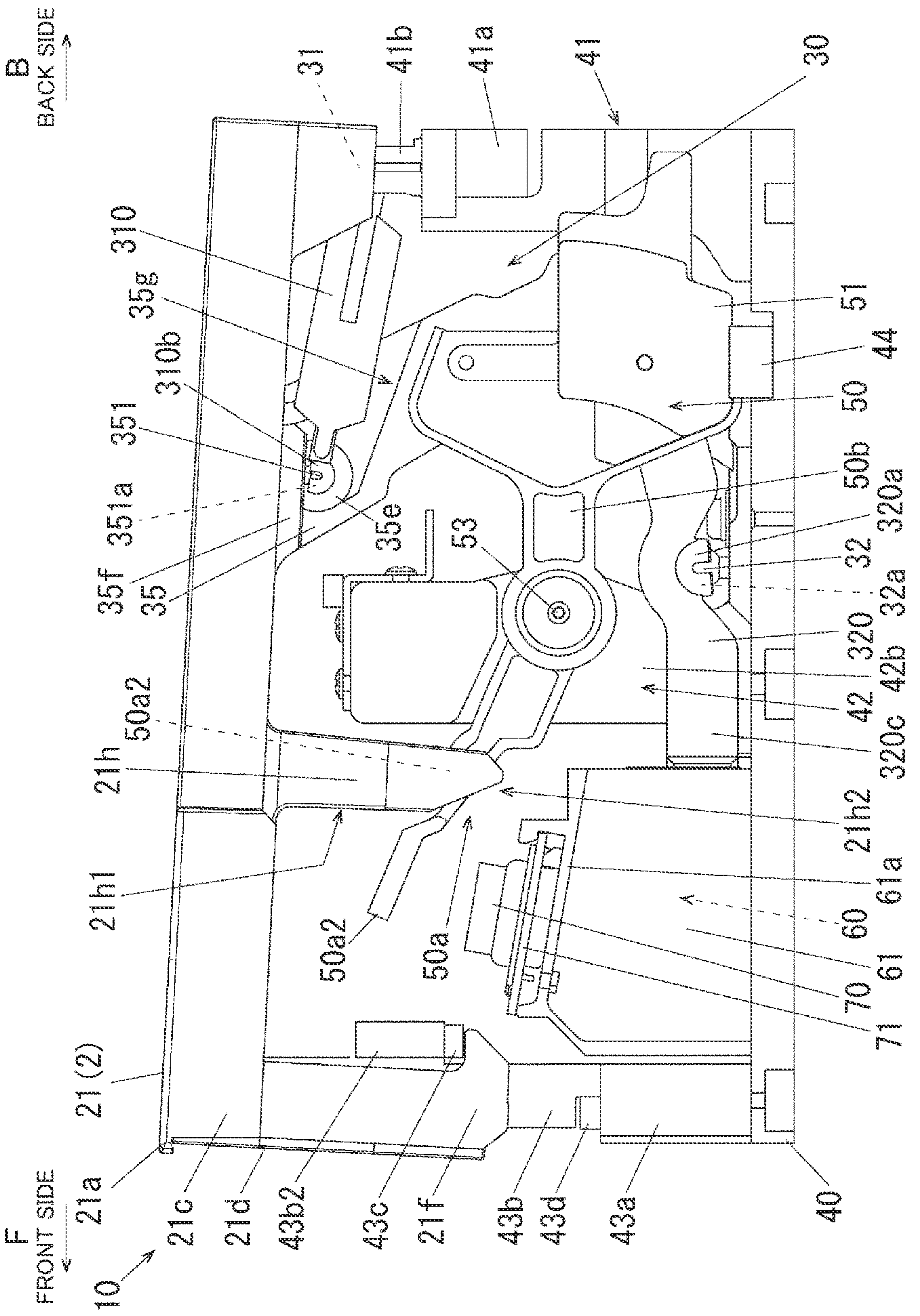
FIG. 5 is a right side view of the keyboard device according to the embodiment of the present disclosure showing schematically the white key and the link mechanism for the white key in the steady state.
Figure 6:
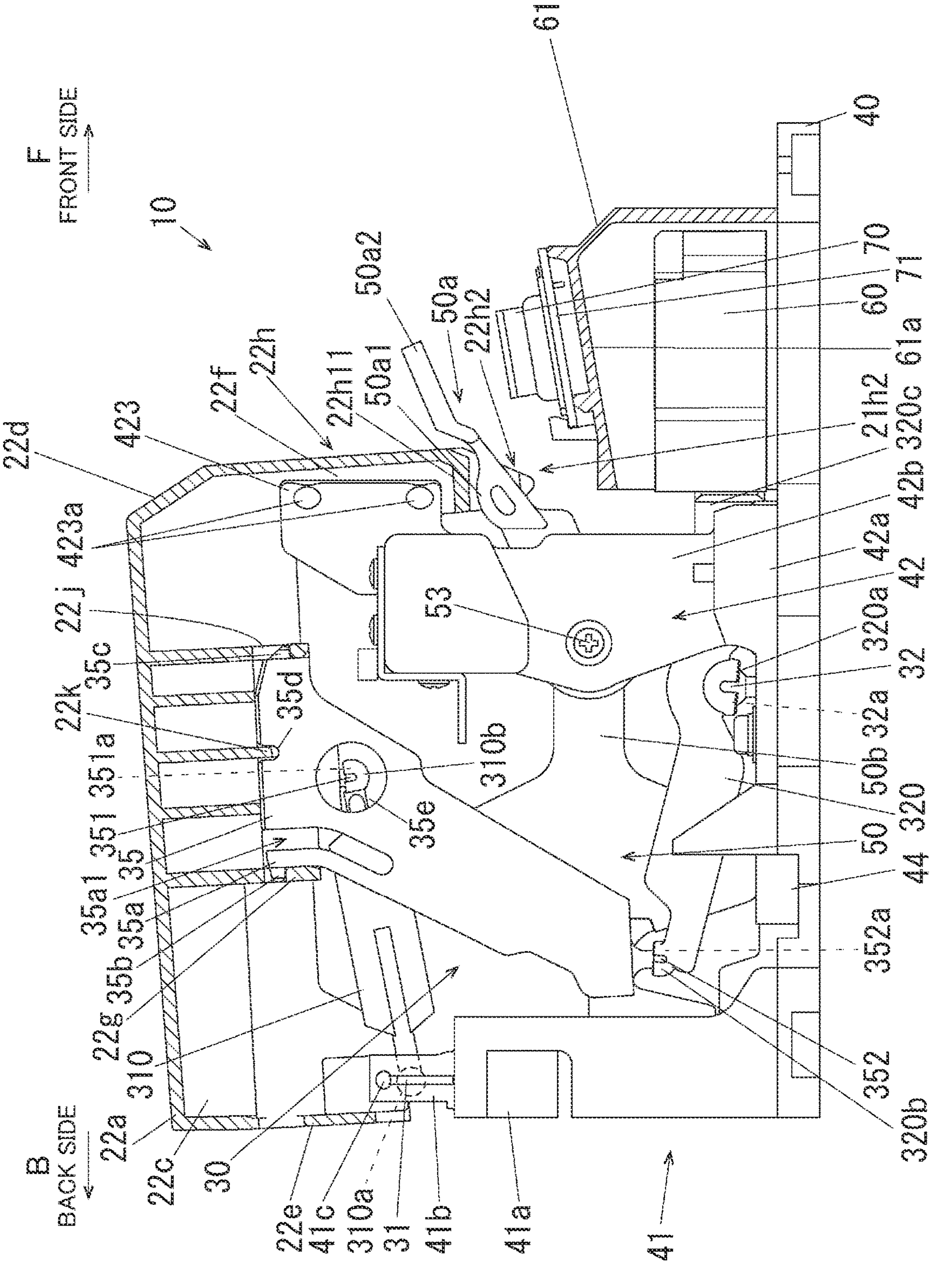
FIG. 6 is a left side view of the keyboard device according to the embodiment of the present disclosure showing schematically the black key and a link mechanism for the black key in the steady state, with the black key and a counterweight case shown in section.
Figure 7:
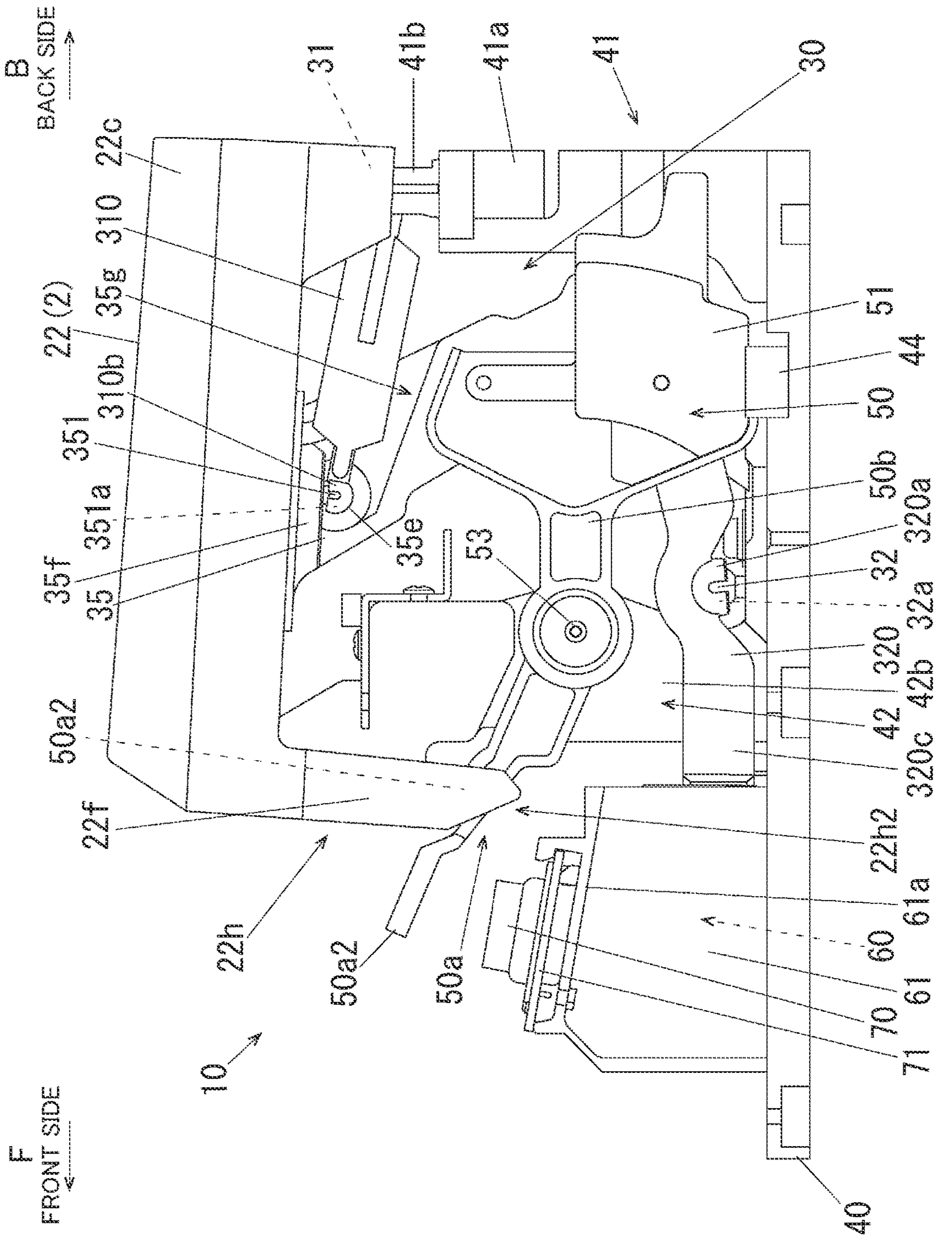
FIG. 7 is a right side view of the keyboard device according to the embodiment of the present disclosure showing schematically the black key and the link mechanism for the black key in the steady state.

Other portions of the left side plate 21*b* and the right side plate 21*c* are made to extend towards the lower side Lo, whereby a hammer press rod 21*h* is provided between the front plate 21*d* and the back plate 21*e* of the white key 21. A plate-shaped hammer press rod front plate 21*h*1 is provided between the portions of the side plate 21*b* and the right side plate 21*c* which are made to extend to provide the hammer press rod 21*h* in such a manner as to extend therebetween while facing the front side F. As shown in FIG. 4, the hammer press rod front plate 21*h*1 includes a lower end portion 21*h*11 which is bent towards the back side B. This lower end portion 21*h*11 is opened downwards. In other words, a bifurcated distal end 21*h*2, which is made up of lower end portions of the portions of the left side plate 21*b* and the right side plate 21*c* which face each other, is provided at a distal end portion of the hammer press rod 21*h*.

The coupling link 35 is provided between the hammer press rod 21*h* and the back plate 21*e* of the white key 21. The coupling link 35 is provided substantially into a single plate which extends from a lower surface of the upper surface plate 21*a* of the white key 21 towards the lower side Lo with flat plate portions thereof oriented to face the left-right direction. In the coupling link 35, a U-shaped slit 35*a*1 is provided to extend from an upper end to thereby provide a plate spring 35*a*.

A protrusion 35*b*, which protrudes backwards, is provided on a side, facing the back side B, of a distal end (an upper end) portion of the plate spring 35*a*. A protrusion 35*c*, which protrudes forwards, is provided on a side, facing the front side F, of the upper end portion of the plate spring 35*a* in a position substantially corresponding to the protrusion 35*b*. A groove 35*d* is provided in an upper end of the coupling link 35 between the protrusions 35*b*, 35*c* in such a manner as to penetrate the coupling link 35 in the left-right direction.

Here, fixed walls 21*g*, 21*j* and a fitting rib 21*k* are provided between the left side plate 21*b* and the right side plate 21*c* of the white key 21. Then, the coupling link 35 is fixed to the white key 21 by virtue of a spring-back force of the plate spring 35*a* as a result of the protrusion 35*b* fitting in a hole in the fixed wall 21*g* and the protrusion 35*c* fitting in a hole in the fixed wall 21*j* of the white key 21. The coupling link 35 is positioned as a result of the groove 35*d* fitting on the fitting rib 21*k*. Here, the coupling link 35 may be integrated with the white key 21. The degree of freedom in assembling order for assemblage of constituent elements is increased by configuring the key 2 and the coupling link 35 as separate members as in the case with the present embodiment, which also facilitates the assemblage.

A circular hole 35*e* is provided in an upper portion of the coupling link 35 in such a manner as to penetrate the coupling link 35 in the key aligning direction LR. A coupling ball 351*a* is provided on a right side surface of the coupling link 35 in such a manner as to protrude from a lower surface of a protruding portion 35*f* (refer to FIGS. 3 and 5) which bulges out downwards. The coupling ball 351*a* is disposed in a position corresponding to the circular hole 35*e*. The coupling ball 351*a* is coupled with a coupling cup 310*b* disposed on the other end side of the first link 310 which lies opposite to one end side where slitting is provided through a cup-and-ball joint. A groove 35*g* (refer to FIGS. 3 and 5) is provided in the right side surface of the coupling link 35 so as to avoid an interference with the first link 310. The coupling ball 351*a* and the coupling cup 310*b* which are so coupled together constitute the first coupling point 351 as a coupling point. In other words, the other end side of the first link 310 is rotatably coupled with the first coupling point 351 of the coupling link 35.

In addition, a coupling ball 352*a*, which protrudes towards the lower side Lo, is also provided at a lower end of the coupling link 35 similarly. The coupling ball 352*a* is coupled with a coupling cup 320*b* disposed on the other end side of the second link 320 which lies opposite to one side where slitting is provided through a cup-and-ball joint. The coupling ball 352*a* and the coupling cup 320*b* which are so coupled together constitute the second coupling point 352 as a coupling point. In other words, the other end side of the second link 320 is rotatably coupled with the second coupling point 352 of the coupling link 35.

The first coupling point 351 is disposed further upwards to the upper side Up and further forwards towards the front side F than the second coupling point 352. A distance between the first coupling point 351 and the second coupling point 352 on the coupling link 35, which is formed into the single plate member, remains unchanged during a key operation.

The first member 41, having substantially a thick plate shape, is provided on a side, facing the back side B, of an upper surface of the base 40 with flat surface sides thereof oriented to face the key aligning direction LR. Here, the base 40 may be configured as a bottom plate of the case 11. An upper limit stopper 41*a* is provided on the first member 41, and this upper limit stopper 41*a* has substantially a quadrangular prism shape and is elongated in the key aligning direction LR. The upper limit stopper 41*a* constitutes a rising limit stopper for a weight 51 of the hammer 50, which will be described later, when the weight 51 is operated to oscillate. For example, an elastic member such as one made of felt is applied to the upper stopper 41*a*.

A coupling ball bearer 41*b*, which protrudes towards the upper side Up, is provided at an upper end of the first member 41. The coupling ball bearer 41*b* is provided substantially into a bifurcated pillar (also, refer to FIG. 3), and a coupling ball 310*a*, which is provided on the one end side of the first link 310, is coupled with the coupling ball bearer 41*b* through a cup-and-ball joint while being held in the bifurcated pillar. The coupling ball bearer 41*b* and the coupling ball 310*a* which are so coupled together constitute the first fixing fulcrum 31. In other words, the one end side of the first link 310 is rotatably coupled with the first fixing fulcrum 31 of the first member 41.

The coupling ball bearer 41*b* is inserted between the left side plate 21*b* and the right side plate 21*c* on the back side B. A spherical guide 41*c*, which protrudes semi-spherically, is provided on each of left and right side surfaces of the coupling ball bearer 41*b*. The spherical guides 41*c* are brought into sliding contact with corresponding inner surfaces of the left side plate 21*b* and the right side plate 21*c*. The spherical guides 41*c* are intended to guide a movement of the key occurring in association with a key operation so as to prevent a lateral deviation of the white key 21 in the key aligning direction LR.

On the other hand, the second member 42 is provided on the front side F of the first member 41, that is, substantially at a center of the base 40 in the front-back direction FB. The second member 42 has a fixed plate 42*a*, which extends substantially into a flat plate on the upper surface of the base 40, and a substantially plate-shaped strut 42*b*, which is erected from the fixed plate 42*a*. The strut 42*b* is provided in such a manner that plate surfaces thereof are oriented to face the left-right direction. The coupling ball 32*a* is provided on the fixed plate 42*a* in such a manner as to protrude therefrom towards the upper side Up. On the other hand, a coupling cup 320*a*, in which slotting is provided, is provided on one end side of the second link 320. The coupling ball 32*a* is coupled with the coupling cup 320*a* on the one end side of the second link 320 through a cup-and-ball joint. The coupling ball 32*a* and the coupling cup 320*a* which are so coupled together constitute the second fixing fulcrum 32. In other words, the one end side of the second link 320 is rotatably coupled with the second fixing fulcrum 32 of the second member 42.

The second fixing fulcrum 32 is provided further forwards towards the front side F and further downwards towards the lower side Lo than the first fixing fulcrum 31. The one end side of the second link 320 is pivotally supported on the second fixing fulcrum 32. As described above, the other end side of the second link 320 is rotatably coupled with the second coupling point 352 of the coupling link 35. The coupling link 35 couples the first link 310 and the second link 320 together and is configured such that a distance between the other end side of the first link 310 which rotates about the first fixing fulcrum 31 in response to a key operation and the other end side of the second link 320 which rotates about the second fixing fulcrum 32 in response to the key operation is fixed and remains unchanged.

The coupling cup 320*a* of the second link 320 is provided at an arc-shaped portion lying substantially at a central portion of the second link 320 which is long in the front-back direction FB. Then, in the second link 320, the counterweight 60 is provided further forwards towards the front side F than the coupling cup 320*a* (the second fixing fulcrum 32). The counterweight 60 is provided fixedly at a distal end of an attachment rod 320*c* which extends further forwards towards the front side F than the second fixing fulcrum 32 of the second link 320.

The counterweight 60 is such that a flat rectangular parallelepiped body, which is long in the front-back direction FB, is disposed vertically (with larger flat surfaces thereof oriented to face the key aligning direction LR). The counterweight 60 is accommodated in an interior of a counterweight case 61 provided on the base 40. The counterweight case 61 is opened towards the back side B so as to match the attachment rod 320*c* which is connected to the counterweight 60. An upper surface plate 61*a* of the counterweight case 61 is provided in such a manner as to be inclined from the front side F towards the back side B so as to match a state in which the counterweight 60 is raised.

A substrate 71, on which the switch 70 is to be provided, is provided on an upper surface of the upper surface plate 61*a* of the counterweight case 61. The substrate 71 is disposed to slope down from the front side F to the back side B in such a manner as to follow the upper surface plate 61*a*. As a result, an upper surface of the switch 70 is also disposed to slope down from the front side F towards the back side B similarly. Although the counterweight case 61 and the substrate 71 are shown partially in FIGS. 2 to 8, the counterweight case 61 and the substrate 71 can be provided into one unit which is long in the key aligning direction LR.

A fulcrum 53 for the hammer 50 is provided on the strut 42*b* of the second member 42. The hammer 50 is fixed in such a manner as to rotate about the fulcrum 53. That is, the second member 42 is referred to as a hammer holder having the fulcrum 53 configured to pivotally support the hammer 50 for rotation. In other words, the hammer holder is integrated into the second member 42. As a specific structure of the fulcrum 53, for example, a structure can be adopted in which a shaft hole in the hammer 50 is pivotally supported in such a manner as to rotate around a shaft which is screwed to the strut 42*b* of the second member 42.

The hammer 50 has an extending member 50*a* which extends forwards of the fulcrum 53 towards the front side F, and has a connecting rod 50*b* which is disposed backwards of the fulcrum 53 towards the back side B. The extending member 50*a* and the connecting rod 50*b* are provided in such a manner as to be bent at the fulcrum 53. The extending member 50*a* includes a sliding-contact area 50*a*1, which is provided in such a manner as to protrude upwards into an arc shape towards the upper side Up, and the press-down area 50*a*2, which extends further forwards towards the front side F than the sliding-contact area 50*a*1 in such a manner as to be formed substantially into a flat plate.

The sliding-contact area 50*a*1 is disposed in a position corresponding to the hammer press rod 21*h* so as to be brought into sliding contact with a lower surface of a lower end portion 21*h*11 of the hammer press rod front plate 21*h*1. In this way, the hammer press rod 21*h* is provided in such a manner that the sliding-contact area 50*a*1 of the extending member 50*a* moves towards and away from a space defined in the bifurcated distal end 21*h*2 of the hammer press rod 21*h*. In addition, the press-down area 50*a*2 protrudes further forwards towards the front side F than the hammer press rod 21*h* so as to constitute an area which is configured to be brought into abutment with an upper surface of the switch 70 to press down the switch 70.

Here, the extending member 50*a* can also include a hammer cap. Specifically speaking, a part or a whole of the extending member 50*a* can be made into a hammer cap which is made up of an elastic material such elastomer, silicone resin, or the like. In this case, the press-down area 50*a*2 can be provided on the hammer cap.

On the other hand, the weight 51, having a wide plate shape, is provided at a distal end portion of the connecting rod 50*b* (one end side of the hammer 50) on the back side B of the hammer 50. The weight 51 is provided such that multiple plate-shaped weight plates are fixed to a main body portion which is connected to the connecting rod 50*b*.

A front leg guide 43, having substantially a pillar shape, is provided on the base 40 in a position lying further forwards towards the front side F than the second member 42. The front leg guide 43 includes a proximal portion 43*a*, which has a prism shape and is provided on the base 40, and a key guide 43*b*, which is narrower in width than the proximal portion 43*a* and is disposed between the left and right front legs 21*f* of the white key 21. The key guide 43 is provided substantially into a pillar which is long in a vertical direction, and a spherical guide 43*b*1 is provided at two upper and lower portions on each of left and right side surfaces of the key guide 43*b*. The spherical guides 43*b*1 of the key guide 43*b* are brought into sliding contact with inner surfaces of the front legs 21*f* so as to guide a movement of the key occurring in association with a key operation, and thus, the spherical guides 43*b*1 are intended to prevent a lateral deviation of the white key 21 in the key aligning direction LR.

A protrusion beam 43*b*2 is provided on the key guide 43*b* in such a manner as to protrude towards the back side B. A lower limit stopper 43*c*, which is made up of an elastic material such as felt, is provided on a lower surface of the protrusion beam 43*b*2. In addition, a lower limit stopper 43*d*, which is made up of an elastic material such as felt, is provided on an upper surface of the proximal portion 43*a* of the front leg guide 43. Upper surfaces of hook portions of the front legs 21*f* are brought into abutment with the upper limit stopper 43*c*, whereby the white key 21 is restricted from rising. Similarly, lower surfaces of the hook portions of the front legs 21*f* are brought into abutment with the lower limit stopper 43*d*, whereby the white key 21 is restricted from falling.

As with the white key 21, the black key 22 also includes the link mechanism 30, the hammer 50, the switch 70, and the like. As a result, for description of the black key 22 and the link mechanism 30, the hammer 50, and the like which are associated with the black key 22, like reference numerals are given to like members and like portions so as to omit or simplify descriptions thereof. Thus, structures differing from those of the white key 21 will be described based on FIGS. 6 and 7. The black key 22 includes an upper surface plate 22*a* including a surface where the black key 22 is pressed, a left side plate 22*b*, a right side plate 22*c*, and a back plate 22*e*. Side surfaces of the left side plate 22*b* and the right side plate 22*c* of the black key 22 which lie on the front side F are made to extend towards the lower side Lo so as to constitute front legs 22*f* which face each other in the left-right direction. A front plate 22*d* is provided on the black key 22 in such a manner as to cover a space defined between the left side plate 22*b* and the right side plate 22*c* and a space defined between the front legs 22*f*. In the black key 22, a hammer press rod 22*h* is formed by the front legs 22*f* and the front plate 22*d*. That is, in the front plate 22*d*, a lower end portion 22*h*11 of the front plate 22*d* is bent towards the back side B in a position above a lower end of the front leg 22*f*, and the lower end portion 22*h*11 is opened downwards. As a result, a bifurcated distal end 22*h*2, which is made up of lower end portions of the facing front legs 22*f*, is provided at a distal end portion, constituting a lower end, of the hammer press rod 22*h*. Here, the distal end portions of the front legs 22*f* are shaped to taper off.

On the other hand, a second member 42 includes a guide plate 423, which is inserted between the front legs 22*f* of the black key 22 with plate surfaces thereof oriented to face the left-right direction. Two upper and lower spherical guides 423*a* are provided on each of left and right side surfaces of the guide plate 423 in such a manner as to be brought into sliding contact with inner surfaces of the front legs 22*f*. The black key 22 is guided by the spherical guides 423*a*.

As with the white key 21, a spherical guide 41*c* is provided on a coupling ball bearer 41*b* on the back side B of the black key 22, whereby portions of the left side plate 22*b* and the right side plate 22*c* which bulges out downwards are guided thereby. As with the white key 21, the black key 22 includes a fixed wall 22*g* having a hole in which a protrusion 35*b* on the coupling link 35 is fitted, a fixed wall 22*j* having a hole in which a protrusion 35*c* is fitted, and a fitting rib 22*k* which is fitted in a groove 35*d*.

The front legs 22*f* of the black key 22 are made to make up the hammer press rod. A bifurcated distal end 22*fa* is provided between distal ends (lower ends) of the front legs 22*f* of the black key 2, and an extending member 50*a* of the hammer 50 for the black key 22 is provided in such a manner as to move towards and away from the bifurcated distal end 22*f*a.

The key 2 operates as below. Here, the operation of the white key 21 will be described as an example. In a steady state in which no key press operation is performed as shown in FIGS. 2 to 5, in the white key 21, the weight 51 of the hammer 50 is positioned downwards due to its own weight, and the weight 51 is in abutment with a cushion 44 disposed on the base 40 in such a manner as to face the weight 51. On the other hand, the extending member 50*a*, which is disposed opposite to the weight 51 across the fulcrum 53, is positioned upwards. The sliding contact area 50*a*1 of the extending member 50*a* pushes up the lower end portion 21*h*11 of the hammer press rod front plate 21*h*1, whereby the upper surfaces of the hook portions of the front legs 21*f* are left in abutment with the upper limit stopper 43*c*.

Figure 8:
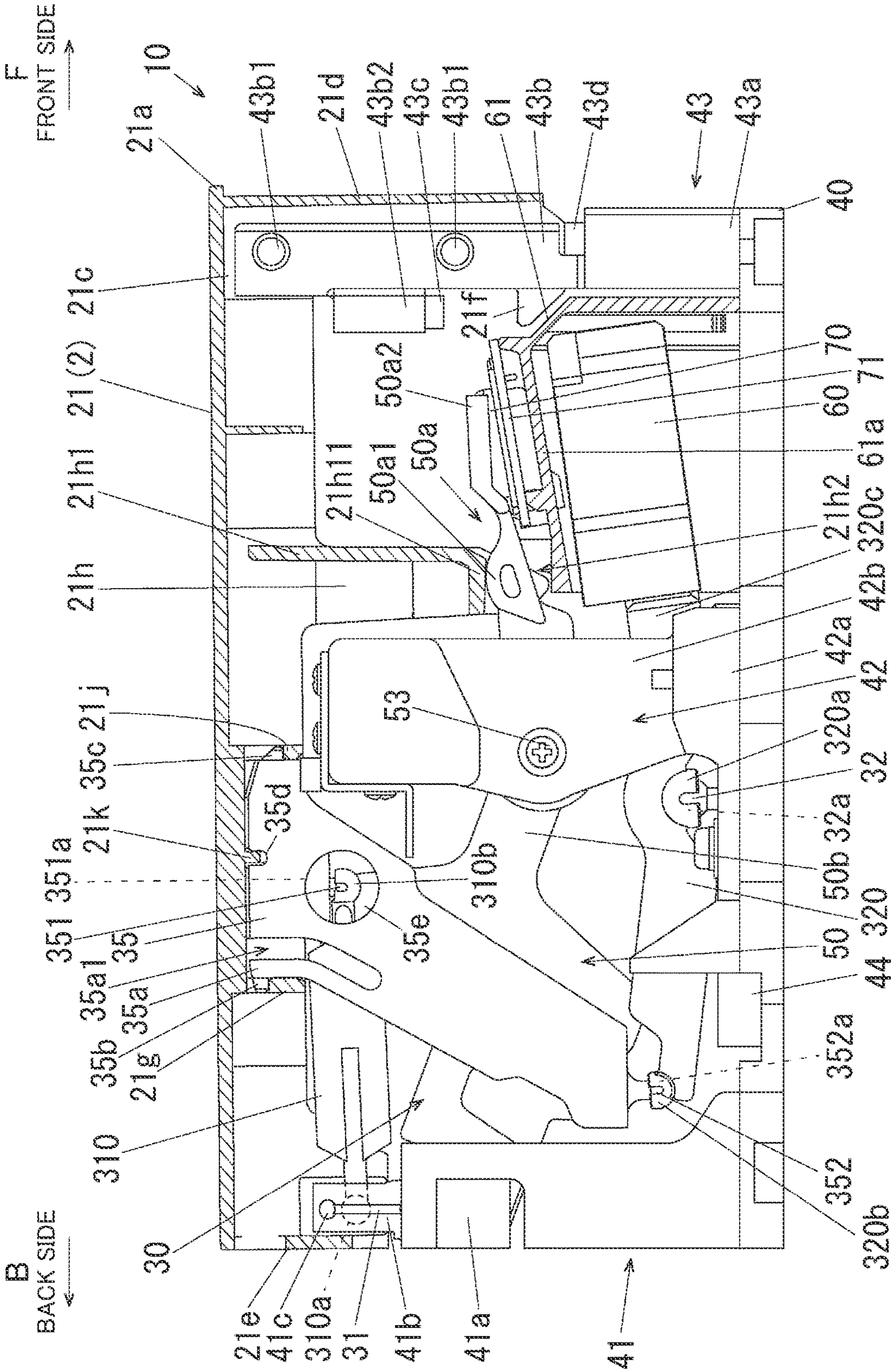
FIG. 8 is a left side view, corresponding to FIG. 4, of the keyboard device according to the embodiment of the present disclosure, showing schematically the white key and the link mechanism for the white key in a state in which the key is pressed.

As shown in FIG. 8, when the white key 21 is pressed, the extending member 50*a* is pushed down against the own weight of the weight 51 of the hammer 50 by the hammer press rod 21*h* (specifically, a lower surface of the lower end portion 21*h*11 of the hammer press rod front plate 21*h*1 which is brought into abutment with the sliding contact area 50*a*1 of the extending member 50*a* for sliding contact). Then, the hammer 50 rotates about the fulcrum 53, whereby the weight 51 is caused to rise. When the weight 51 rises, the press-down area 50*a*2 of the extending member 50*a*, which lies opposite to the weight 51 across the fulcrum 53, is lowered downwards, whereby the press-down area 50*a*2 is brought into abutment with the upper surface of the switch 70 to thereby press down the switch 70. In this way, the press-down area 50*a*2 is interlocked with the key 2, and the switch 70 corresponding to each key 2 is pressed down by the press-down area 50*a*2, whereby a note corresponding to each key is sounded. Then, the weight 51 is brought into abutment with the upper limit stopper 41*a*, and the lower surfaces of the front legs 21*f* are brought into abutment with the lower limit stopper 43*d*, whereby the key press operation is completed. Here, the black key 22 also operates similarly.

Figure 9A:
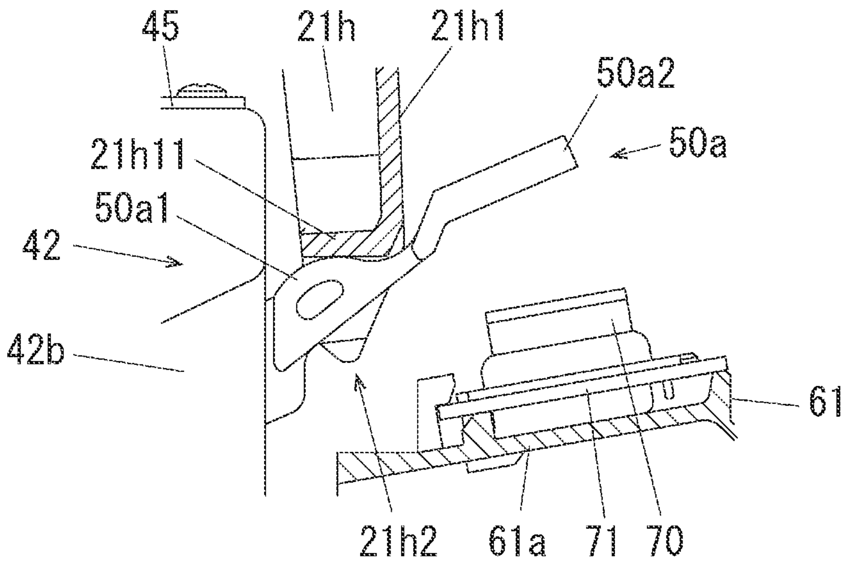
FIGS. 9A and 9B are diagrams illustrating operations of a hammer press rod and an extending member when the white key of the keyboard device according to the embodiment of the present disclosure is struck strongly, FIG. 9A illustrating a state in which the key is started to be struck, FIG. 9B illustrating a state in which the key is being struck.
Figure 9B:
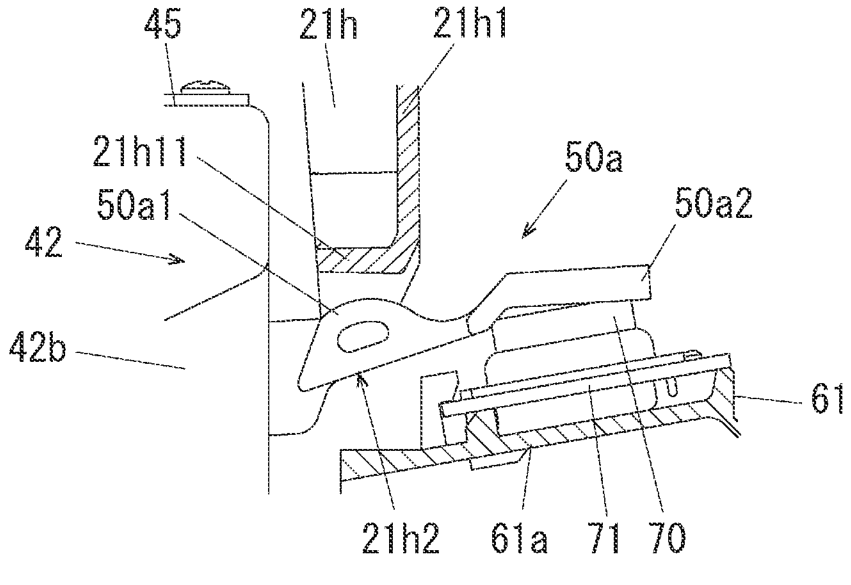

In addition, as described above, the sliding contact area 50*a*1 of the extending member 50*a* is provided in such a manner as to move towards and away from the bifurcated distal end 21*h*2, 22*fa* of the hammer press rod 21*h*, 22*h*. As a result, in the case that the key 2 (the white key 21 in FIG. 9) is struck or pressed strongly, at the beginning of the press operation shown in FIG. 9A, the sliding contact area 50*a*1 and the lower surface of the lower end portion 21*h*11 of the bifurcated distal end 21*h*2 are in abutment with each other. However, the sliding contact area 50*a*1 moves away from the lower end portion 21*h*11 by virtue of the inertial force of the extending member 50*a* before the key 2 reaches its lower limit position as shown in FIG. 9B, and the switch 70 is pressed down by the press-down area 50*a*2 before the key 2 is pressed down completely. That is, the extending member 50*a* can press down the switch 70 without contacting the hammer press rod 21*h*, 22*h*.

Figure 10A:
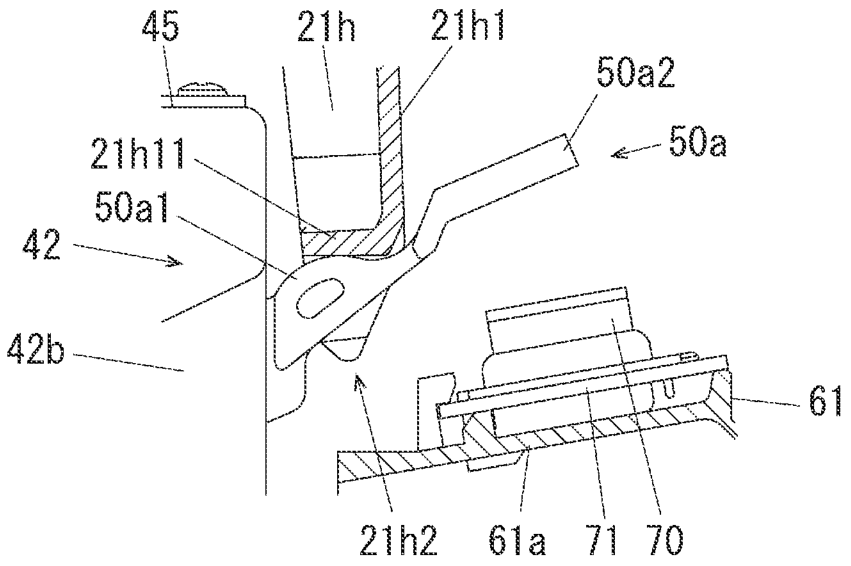
FIGS. 10A and 10B are diagrams illustrating operations of the hammer press rod and the extending member when the white key of the keyboard device according to the embodiment of the present disclosure is struck weakly, FIG. 10A illustrating a state in which the key is started to be struck, FIG. 10B illustrating a state in which the key is being struck.
Figure 10B:
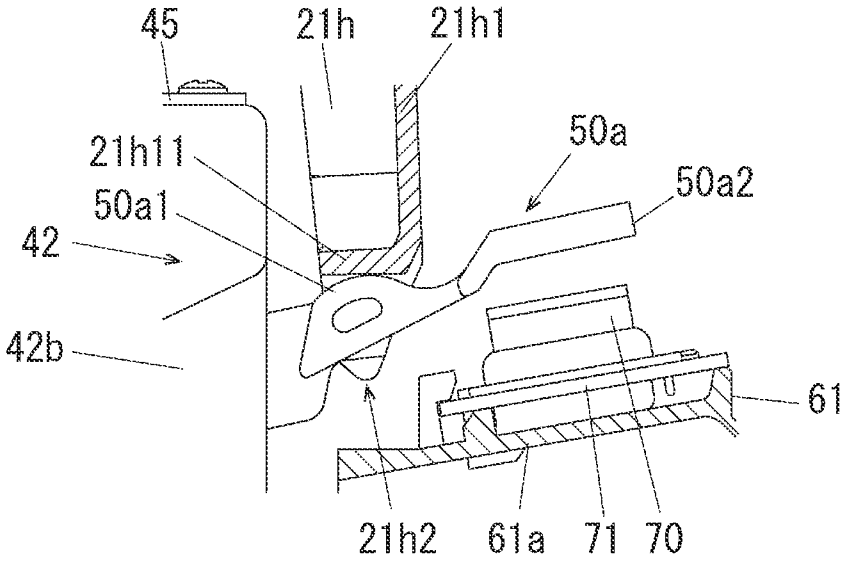

On the other hand, in the case that the key 2 is pressed weakly, even at the beginning of the press operation shown in FIG. 10A, or even before the key 2 reaches its lower limit position as shown in FIG. 10B, the sliding contact area 50*a*1 and the lower surface of the lower end portion 21*h*11 remain in abutment with each other. That is, the sliding contact area 50*a*1 and the lower surface of the lower end portion 21*h*11 are left in abutment with each other over a whole range of the stroke of the key 2. In this way, with the keyboard instrument 1 (the keyboard device 10), when the key 2 is struck strongly, the extending member 50*a* which is pressed by the hammer press rod 21*h*, 22*h* of the key 2 moves away from the key 2 to thereby switch on the switch 70 as if by being thrown away, thereby making it possible to realize a playing feeling close to an action and an operation of a grand piano. Then, when the switch 70 is switched on, an external member of a rubber material which makes up the switch 70 is collapsed, however, since the extending member 50*a* including the press-down area 50*a*2 moves away from the hammer press rod 21*h*, 22*h*, it becomes difficult to transfer a feeling of collapsing the rubber external member to the finger of the player, thereby making it possible to improve the playing feeling.

In the present embodiment, when the key 2 (the white key 21, the black key 22) is pressed, the coupling link 35 moves upwards and downwards while being restricted by the first link 310 and the second link 320 in such a state that the distance between the first coupling point 351 and the second coupling point 352 is fixed. In other words, the coupling link 35 moves upwards and downwards with an imaginary link rotating which couples the first coupling point 351 and the second coupling point 352 together. Then, not only a front end portion of the key 2 but also a back end portion of the key 2 moves vertically. That is, an imaginary rotation center is set on a prolonged line (rearwards of the key 2) which connects the front end portion with the back end portion of the key 2, whereby the key 2 can obtain a dynamic property closed to that of a grand piano.

Then, the counterweight 60, which is provided further forwards towards the front side F than the second fixing fulcrum 32 of the second link 320, rises as the key 2 lowers, and rises as the hammer 50 rises. Referring to FIGS. 4 and 8, the counterweight 60 rotates counterclockwise, while the hammer 50 rotates clockwise. The facilitation of balancing the weight 51 relative to the key 2 in the front-back direction (balancing for a key press operation) and adjusting the weight of the weight 51 is realized by the counterweight 60, and the counterweight 60 can be interlocked with the weight 51 by making use of not only the hammer 50 but also the members connecting to the hammer 50.

With the link mechanism 30 according to the present embodiment, the first link 310 and the second link 320 are coupled with the first member 41, the second member 42, and the coupling link 35 through the cup-and-ball joint. In other words, the first fixing fulcrum 31, the second fixing fulcrum 32, the first coupling point 351, and the second coupling point 352 are pivotally supported in such a manner as to rotate through the cup-and-ball joint. However, the pivotal support through the cup-and-ball joint is not limited to the cup-and-ball joint, and hence, for example, a configuration made up of a shaft and a bearing can also be adopted for the pivotal support.

Thus, according to the embodiment of the present disclosure, the keyboard instrument 1 has the key 2 and the link mechanism 30 provided on the lower side of the key 2. The link mechanism 30 has the first member 41 having the first fixing fulcrum 31, the first link 310 pivotally supported on the first fixing fulcrum 31 on the one end side thereof, the second member 42 having the second fixing fulcrum 32 which is provided further forwards to the front side F and further downwards towards the lower side Lo than the first fixing fulcrum 31, the second link 320 pivotally supported on the second fixing fulcrum 32 on the one end side thereof, and the coupling link 35 configured such that the distance between the other end side of the first link 310 which rotates about the first fixing fulcrum 31 in response to a key operation and the other end side of the second link 320 which rotates about the second fixing fulcrum 32 in response to the key operation is fixed and remains unchanged, and the second link 320 has the counterweight 60 which is provided further forwards towards the front side F than the second fixing fulcrum 32.

As a result, even though the keyboard instrument 1 or the key 2 includes the link mechanism 30 with which the key 2 can obtain the dynamic property close to that of keys of a grand piano, the key 2 can be well balanced in the front-back direction by the counterweight 60 when the key 2 is pressed.

The first coupling point 351 of the coupling link 35, which constitutes the coupling point with the first link 310, is disposed further upwards towards the upper side Up and further forwards towards the front side F than the second coupling point 352 of the coupling link 35, which constitutes the coupling point with the second link 320. As a result, the key 2 can obtain a moving amount and a rotational angle which are close to those of a grand piano by setting angles and moving amounts of the first coupling point 351 and the second coupling point 352.

The counterweight 60 is provided on the attachment rod 320*c* which extends further forwards towards the front side F than the second fixing fulcrum 32 of the second link 320. As a result, the counterweight 60 can be provided without enlarging the structure in size, not only the hammer 50 but also the members connected to the hammer 50 can be interlocked with the weight 51.

The counterweight 60 is accommodated in the counterweight case 61. As a result, the space in the interior of the keyboard instrument 1 can be saved, whereby other members can easily be disposed above the counterweight 60, thereby making it possible to make the keyboard instrument 1 smaller in size.

The substrate 71, on which the switch 70 is provided, is provided on the upper surface of the counterweight case 61, and the switch 70 is pressed down by the press-down area 50*a*2 which is interlocked with the key 2. As a result, electronic components which make the keyboard instrument 1 into an electronic keyboard instrument can easily be disposed in the case 11 of the keyboard instrument 1.

The first link 310 and the second link 320 are coupled individually with the first member 41, the second member 42, and the coupling link 35 through the cup-and-ball joint, thereby constituting the first fixing fulcrum 31, the second fixing fulcrum 32, the first coupling point 351, and the second coupling point 352, respectively. As a result, the assembling work can easily be performed only by preparing the members having those coupling portions using a resin material and fitting the coupling balls in the cup-shaped bearers including the slit.

The key 2 is guided at the front and back of the key 2 by the spherical guides 41*c*, 43*b*1, 42Ba. As a result, the action of the key 2 can be guided by the spherical guides 41*c*, 43*b*1, 42Ba which can easily be provided through injection mold using a resin material in an ensured fashion, while absorbing production errors.

The keyboard instrument 1 has the weight 51 which is rotated by the hammer press rod 21*h*, 22*h* which is provided on the key 2, and the counterweight 60 is provided on the front side F, while the weight 51 is provided on the back side B. As a result, with the keyboard instrument 1, to obtain an appropriate load property for pressing the key, since the weight of the counterweight 60 only need be adjusted, a target load property can easily be obtained, and no other adjusting means is required, thereby making it possible to simplify the structure. The counterweight 60 and the weight 51 oscillate in the same direction when the key 2 is pressed, that is, the counterweight 60 and the weight 51 oscillate in the same vertical direction. As a result, when the key 2 is pressed, the key 2 can be balanced appropriately in the front-back direction including the oscillating operation of the weight 51.

The weight 51 is provided on the hammer 50, and the counterweight 60 is provided in the link mechanism 30. As a result, when the key 2 is pressed, the key 2 can be well balanced in the front-back direction including the hammer 50 which is the connection member to which the weight 51 is connected as well as the link mechanism 30.

While the embodiment of the present disclosure has been described heretofore, the embodiment is presented as the example, and hence, there is no intention to limit the scope of the present invention by the embodiment. The novel embodiment can be carried out in other various forms, and various omissions, replacements, and modifications can be made thereto without departing from the spirit and scope of the present invention. Those resulting embodiments and modified examples thereof are included in the scope and gist of the present invention and are also included in the scope of inventions claimed for patent under claims below and their equivalents.

What is claimed is:

1. A keyboard instrument comprising:
a key; and
a link mechanism provided on a lower side of the key,
wherein the link mechanism comprises:
a first member having a first fixing fulcrum;
a first link pivotally supported on the first fixing fulcrum on one end side thereof;
a second member having a second fixing fulcrum provided further forwards and further downwards than the first fixing fulcrum;
a second link pivotally supported on the second fixing fulcrum on one end side thereof; and
a coupling link configured such that a distance between an other end side of the first link which rotates about the first fixing fulcrum in response to a key operation and an other end side of the second link which rotates about the second fixing fulcrum in response to the key operation is fixed and remains unchanged, and
wherein the second link comprises a counterweight provided further forwards than the second fixing fulcrum.

2. The keyboard instrument according to claim 1,
wherein a coupling point of the coupling link with the first link is disposed further upwards and further forwards than a coupling point of the coupling link with the second link.

3. The keyboard instrument according to claim 1,
wherein the counterweight is provided on an attachment rod which extends further forwards than the second fixing fulcrum on the second link.

4. The keyboard instrument according to claim 1,
wherein the counterweight is accommodated in a counterweight case.

5. The keyboard instrument according to claim 4,
wherein a substrate comprising a switch is provided on an upper surface of the counterweight case, and
wherein the switch is pressed down by a press-down area which is interlocked with the key.

6. The keyboard instrument according to claim 1,
wherein the first link and the second link are coupled individually with the first member, the second member, and the coupling link through a cup-and-ball joint.

7. The keyboard instrument according to claim 1,
wherein the key is guided by a spherical guide at a front and a back of the key.

8. The keyboard instrument according to claim 1, comprising:
a weight configured to be rotated by a hammer press rod which is provided in the key,
wherein the counterweight is provided on a front side, and the weight is provided on a back side.

9. The keyboard instrument according to claim 8,
wherein the counterweight and the weight oscillate in a same direction when the key is pressed.

10. The keyboard instrument according to claim 8,
wherein the weight is provided on a hammer, and
wherein the counterweight is provided in the link mechanism.

* * * * *